Oct. 28, 1941.　　D. M. SMITH ET AL　　2,260,345
BEARING CONSTRUCTION
Filed April 20, 1940
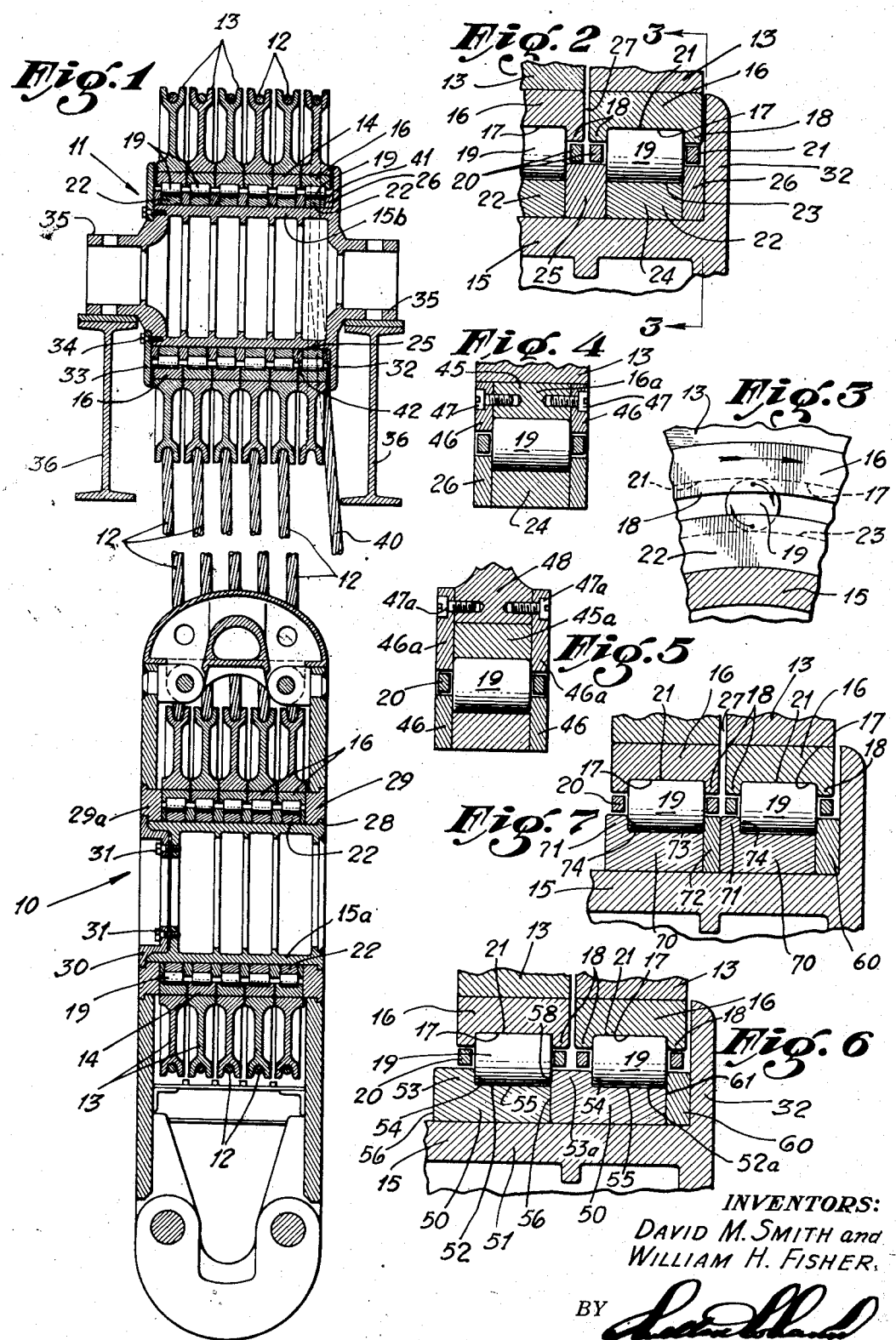
INVENTORS:
DAVID M. SMITH and
WILLIAM H. FISHER,
BY
ATTORNEY Patented Oct. 28, 1941

2,260,345

UNITED STATES PATENT OFFICE 2,260,345

BEARING CONSTRUCTION

David M. Smith, Hermosa Beach, and William H. Fisher, Los Angeles, Calif., assignors to Emsco Derrick & Equipment Company, Los Angeles, Calif., a corporation of California Application April 20, 1940, Serial No. 330,708

6 Claims. (Cl. 254—192)

Our invention relates in general to hoisting apparatus such as employed in oil well derricks and relates in particular to a simplified construction of crown and travelling block having improved renewable and adjustable bearing means therein.

This application is a continuation-in-part of our copending application for Travelling block, Serial No. 302,188, filed October 31, 1939.

The travelling and crown blocks of well drilling equipment are subjected to severe usage owing to the heavy loads which are handled thereby, the result being that design of this type of equipment has tended toward massiveness. The increase in size of this equipment, especially in the travelling block, has resulted in definite disadvantages. Many travelling blocks now in use are of such great width that a relatively large space is required in the derrick for accommodation thereof. Accordingly, an object of our present invention is to provide an efficient and durable bearing means which will contribute to reduction in size of the travelling block, and which is of such character that it may be used also in the crown block, thereby making it possible to space the sheaves of the crown block the same as those of the travelling block, thereby reducing the fleet angle of the lines.

Not only is it an object of the present invention to provide bearing means which may be manufactured, assembled, and serviced at minimum cost, but it is likewise an object of the invention to provide a bearing having cooperating parts which may be adjusted to compensate for wear, and which parts may be economically reconditioned for re-use when maximum permissible wear has taken place.

It is a further object of the invention to provide simple multiple bearing means employing essentially cylindrical rollers, and wherein both radial and thrust loads are carried without use of a massive assembly of cooperating parts.

A further object of the invention is to provide multiple bearing means of the character set forth in the preceding paragraph having a plurality of sets of rollers, and bearing races to receive these rollers, such races being formed of coaxial ring members which are separable along planes positioned so as to permit separation of at least one side wall of a bearing race from the adjacent or cooperating bottom wall of the race.

Further objects and advantages of the invention will be brought out in the following part of the specification.

Referring to the drawing which is for illustrative purposes only:

Fig. 1 is a simple cross-sectional view showing a travelling block and a crown block incorporating our invention.

Fig. 2 is an enlarged fragmentary section showing the inner and outer races of the bearings employed in Fig. 1.

Fig. 3 is a fragmentary elevational view corresponding to Fig. 2 to show the elementary points of thrust contact of the roller bearings with the side walls of the inner and outer bearing races.

Fig. 4 is a fragmentary sectional view showing an alternative inner and outer bearing race assembly.

Fig. 5 is a cross-sectional view similar to Fig. 4 showing another manner of securing the side plates of the outer bearing race.

Fig. 6 is an enlarged fragmentary cross-section showing a form of our new bearing employing the stepped ring in the formation of the inner bearing race.

Fig. 7 is a fragmentary cross-sectional view similar to Fig. 6 showing another manner in which we employ stepped rings in the inner bearing race.

For the purpose of showing the principal utility of our invention, we have in Fig. 1 shown hoisting equipment, such as employed in oil well derricks, comprising a travelling block 10 which is raised and lowered within the derrick and a crown block 11 which is supported at the top of the derrick, these blocks 10 and 11 being interconnected by a cable 12 which runs over the sheaves 13 of the blocks 10 and 11. The sheaves 13 of the travelling and crown blocks constitute rotatable means which are maintained in operative position by bearing devices 14, coaxial with supports 15 individually identified as 15a and 15b. The bearing devices 14 comprise outer races 16, disposed in side-by-side relation, and each having an inwardly presented bottom wall or face 17 and inwardly projecting side walls forming inwardly faced channels 21 to receive sets of bearing rollers 19 which are maintained in spaced arrangement by spacers 20. In the preferred practice of the invention the rollers 19 have a length greater than the diametral dimension thereof. The number of outer races 16 correspond to the number of sheaves 13 in each block 10 or 11, it being noted that there is one more sheave in the crown block 11 than in the travelling block 10, in accordance with an accepted practice. Inner bearing race means 22 provides a plurality of side-by-side channels 23, corresponding in number to the channels 21, in which the rollers 19 may roll.

The supports 15a and 15b comprise cylindrical walls on which the constituent parts of the inner bearing means may be moved into operative position. As shown in Figs. 1, 2, and 3, the inner bearing means 22 comprises a plurality of rings 24, 25, and 26 arranged in end-to-end relation on the supports 15a or 15b so as to form the channels 23. The rings 24 are referred to as bottom wall rings for the reason that they each have a width equal to the length of a roller 19 and form the bottom or radial bearing walls of the channels 23. The rings 25 and 26 are of greater thickness than the rings 24 so that they will project outwardly from the rings so as to form side walls for the channels 23. Accordingly, these rings 25 and 26 may be referred to as thrust bearing walls. The rings 25 are approximately twice the axial dimension of the rings 26 and are placed between adjacent bottom wall rings 24, the rings 26 being placed at the ends of the assembly of rings constituting the inner race means 22. The width of each ring 26 is slightly greater than the width of the side wall 18 of the outer bearing race 16, and the rings 25 have a width slightly more than twice the width of the outer side walls 18, so that spaces 27 will be maintained between adjacent sheaves 13.

The inner ring members 24, 25, and 26 are held in a simple manner on the supports 15a and 15b. All that is necessary in the assembly is that means be provided for holding the ring members 24, 25, and 26 together in face-to-face relation on the cylindrical wall 15a or 15b comprising the supports. To accomplish this purpose rings and shoulders are provided on the opposite ends of the members 15a and 15b. For example, the cylindrical wall 15a of the travelling block 10 has a shoulder 28 at one end thereof acting as a stop for a ring 29. On the opposite end of the cylindrical wall 15a there is a similar ring 29a held in place by a flange fitting 30 which is secured to the ends of the member 15a by screw means 31. The assembly of rings constituting the inner race means 22 is held between the rings 29 and 29a. The cylindrical wall 15b constituting the support for the bearing and sheaves of the crown block 11 have a radial flange 32 at one end thereof, and at the opposite end there is a removable flange 33 secured in operative position by screws 34. The support 15a forms a part of the structure of a travelling block 10, and although it constitutes a support for the bearing means, it is in effect a member whereby the lifting effect transmitted from the cable 12 to the lower set of sheaves 13 is carried to the travelling block which is in turn attached to the object which is to be raised or lowered in the derrick. The upper support 15b is shown with projecting walls 35 for engagement with the structure at the top of the derrick for example, means 36.

The bearing means of the travelling block 10 and the crown block 11, being of relatively large diameter as compared to the diameter of the sheaves 13, and likewise employing cylindrical rollers having ample radial bearing capacity, are so formed that the thrust loads applied to the sheaves will be carried without need for additional or auxiliary thrust bearing means. Owing to the fact that the inner race means do not rotate, wear from the action of the rollers 19 will be localized; whereas, the wear on the outer race members 16 will be evenly distributed owing to the rotation of the outer bearing races with the sheaves. The invention provides means whereby one or more of the ring members of the inner race means may be adjusted so as to bring different points or sections thereof into positions for receiving greatest wear. As shown in Fig. 3 the channels 23 are of greater depth than the channels 21. Preferably the depth of these channels 23 is slightly greater than one-quarter the diameter of the rollers 19, and the channels 21 are each of a depth not greater than one-quarter the diameter of the rollers 19. The end faces of the rollers 19 are substantially flat and merge through rounded corners with the cylindrical bases. The length of each roller 19 is only slightly less than the axial dimension of the channel 21 or 23 in which it rolls, and accordingly the end play in the bearing structure is very small, thereby making it possible to place the sheaves 13 relatively close together as clearly shown in Fig. 1, thereby contributing to the desirable effect of reducing the sheave devices to minimum size for a given load carrying capacity. An important feature of the invention is that one or more of the rings 24, 25, or 26 may be rotated on its support 15a or 15b to a different position of operation. Although our present invention reduces to a minimum the angular pull on the sheave, or, in other words, accomplishes a reduction of the fleet angle of the line, there remains sufficient angularity of pull on the sheave to cause greater wear on the side walls of the inner race channels in definite zones. For example, one end 40 of the cable 12 may be brought off from the crown block 11 at an angle, as shown in Fig. 1. The angular pull of this cable portion 40 results in a definite direct thrust load against the upper portion 41 of the rightward ring 26 and a reacting thrust load in leftward direction against the thrust receiving wall formed by the lower portion 42 of the adjacent ring 25. The rightward ring 26 may be rotated through a part of a revolution after the upper portion 41 thereof has become sufficiently worn, and the adjacent ring 25 may be rotated through a part of a revolution, when required, thereby bringing into operative position new, substantially unworn portions of the thrust bearing faces of the rings 26 and 25 referred to. Naturally, at least one of the end rings 25 will receive greater thrust wear than other of the rings 25 and 26. In my invention the ring 26, or any other of the rings may be readily replaced or serviced by regrinding without complete replacement of the bearing devices 14. Owing to the fact that the cable lines are hung from the upper sheave 13 so that the load thereof is exerted downwardly through the sheaves 13 and the bearing rollers to the rings 24 of the crown block 11, the upper portions of these rings 24 will become worn, whereas, there will be substantially no wear on the lower portions of these rings 24. Likewise, the hanging of the travelling block 10 in the cable lines will result in concentration of radial wear against the lower portions of the rings 24 which form part of the bearing device of the travelling block.

In Figs. 1 to 3 the outer races 16 have been shown of one piece construction, and with the inner races formed from an assembly of replaceable or interchangeable rings. In Figs. 4 and 5 we show a manner in which the principles involved in the inner bearing race means of Figs. 1 to 3 may be employed in the outer races of the bearing. As shown in Fig. 4, an outer race 16a may be formed by use of a radial bearing ring 45 with thrust bearing rings 46 secured to the end faces thereof by means of screws 47 which are threaded into the ring 45, forming thereof an outer race unit which may be pressed into the opening of a sheave 13. Any of the rings 46 and 47 may be replaced as required. Likewise, the inner race rings 24 and 26 shown in conjunction therewith may be replaced.

In Fig. 5 we show an outer bearing race comprising a radial bearing ring 45a disposed between thrust bearing rings 46a which are of greater radial dimension than the rings 46, so that screws 47a may be employed to secure the rings 46a to the sides of the hub 48 of a sheave. These annular members may be readily reground and the bearing devices in which they are employed may be renewed by substitution of oversize rollers.

In Fig. 6 we show an effective manner of forming the inner bearing races from like stepped rings assembled in end-to-end relation on a cylindrical support 51, these stepped rings 50 being so formed as to provide annular channels 52 in which the bearing rollers 19 may roll. Each stepped ring 50 has along one edge thereof a thrust receiving wall 53 to provide a thrust bearing face 54 along one edge of a cylindrical, radial bearing face 55 which meets the opposite edge face 56 of the stepped ring 50. When the stepped rings 50 are assembled in end-to-end relation, a second thrust bearing face 58 is provided for each preceding channel by the thrust bearing wall or lip 53a of the succeeding stepped ring 50. To provide a second bearing face for the final or rightward channel 52a, a spacer ring 60 is placed at the end of the assembly of stepped rings, the outer edge of the spacing ring 60 providing a thrust bearing face 61. The inner bearing races provided by this assembly of rings may be employed with any of the outer bearing races disclosed in the preceding figures. We have shown, however, outer races 16 which are pressed into the bores of sheaves 13. The arrangement shown in Fig. 6 reduces to a minimum the number of parts employed in the roller bearing devices, without sacrificing features of adjustability and replaceability. Each inner bearing race, with the exception of the last one, is formed by a single ring 50 having a radially projecting thrust bearing wall 53 of axial dimension slightly greater than the width of the lips 18 of the outer races 16, thereby spacing the inner race channels 52 so that the spacing of the sets of rollers 19 will be such as to support the sheaves 13 in properly spaced arrangement.

In the alternative inner bearing race construction shown in Fig. 7 we employ stepped rings 70 which are similar to the rings 50 with the exception that the radially extending lips 71 are substantially one-half the width of the thrust bearing walls 53 of the stepped rings 50. In the assembly of these rings 70 a spacer ring 72 is placed adjacent the far, or rightward end of each ring 70 to provide a replaceable thrust bearing face 73 in proper spaced relation to the thrust bearing face 74 provided by a lip 71.

Although we have shown simple and practical forms embodying our invention, it is understood that various changes may be made therein without departing from the spirit of the invention, and accordingly the invention should be limited in scope only by the appended claims.

We claim as our invention:

1. In multiple sheave means having replaceable bearing means of the character described, the combination of: a plurality of outer rotatable sheave means disposed in side-by-side relation; a support extending through said rotatable means; an outer bearing race in each of said outer rotatable means, and surrounding said support, each outer bearing race comprising an annular bottom wall and a pair of lips projecting inward from the edges thereof; a set of cylindrical bearing rollers in each of said outer races; inner bearing race means on said support to receive said rollers, comprising a plurality of radial bearing rings on said support in position to be engaged by said rollers, and spacer rings on said support between said radial bearing rings, the outer portions of said spacer rings projecting so as to form thrust receiving lips for engagement with end faces of said rollers, the axial dimension of said spacer rings being such that said rotatable means will be held in spaced, nonengaging relation by said rollers and the lips cooperating therewith; and means to hold said rings and spacers in end to end engagement on said support.

2. In replaceable bearing means of the character described, the combination of: a plurality of outer rotatable means disposed in side-by-side relation; a support extending through said rotatable means; an outer bearing race in each of said outer rotatable means, and surrounding said support, each outer bearing race comprising an annular bottom wall and a pair of lips projecting inward from the edges thereof; a set of cylindrical bearing rollers in each of said outer races; and inner bearing race means on said support to receive said rollers, comprising a plurality of bearing rings each having a radial bearing wall and a thrust receiving lip projecting from an edge of said radial bearing wall, and a plurality of spacer rings between said bearing rings, the outer portions of said spacer rings projecting so as to form thrust receiving lips.

3. In a multiple sheave device of the character described, the combination of: a plurality of sheave members disposed in side-by-side relation; a common support extending through said sheave members; an outer bearing race in each of said sheave members, each outer bearing race comprising an annular channel having a bottom wall and a pair of side lips; a plurality of inner bearing races comprising a plurality of ring elements in end to end engagement and slidable on said support into position within said outer bearing races, each of said inner bearing races comprising at least two of said ring elements so formed as to provide a channel having a bottom wall and projecting thrust receiving lips along the edges of said bottom wall, the surfaces of separation between said ring elements being so placed that said thrust receiving lips may be separated by separation of two of said ring elements; cylindrical bearing rollers in said inner and outer bearing races; and means to hold said ring elements in face to face engagement on said support.

4. In a multiple sheave device of the character described, the combination of: a plurality of sheave members disposed in side-by-side relation, a common support extending through said sheave members; an outer bearing race in each of said sheave members, each outer bearing race comprising an annular channel having a bottom wall and a pair of side lips; a plurality of inner bearing races comprising a plurality of ring elements in end to end engagement and slidable on said support into position within said outer bearing races, each of said inner bearing races comprising at least two of said ring elements so formed as to provide a channel having a bottom wall and projecting thrust receiving lips along the edges of said bottom wall, the surfaces of separation between said ring elements being so placed that at least one thrust receiving lip of each inner bearing race may be separated from the bottom wall and the other lip associated therewith; cylindrical bearing rollers in said inner and outer bearing races; and means to hold said ring elements in face to face engagement on said support.

5. In a multiple sheave device of the character described, the combination of: a plurality of sheave members disposed in side-by-side relation, each of said sheave members having an opening defined by an outer race comprising an annular channel having a bottom wall and a pair of side lips; a common support extending through said openings of said sheave members; a plurality of rollers in each of said outer races; inner bearing race means comprising a plurality of bearing rings and spacer rings slidable in alternate order and in end to end engagement onto said support into position within said outer races, said spacer rings being of greater radial dimension than said bearing rings and cooperating therewith to form a plurality of inner races to receive said rollers, and each comprising an annular channel with a bottom wall and side lips extending along said bottom wall; said spacer rings being of such axial dimension that the channels of said inner races will be spaced so as to maintain said sheave members in spaced relation; and means to hold said rings in end to end engagement on said support.

6. In a replaceable bearing means of the character described, the combination of: a plurality of outer rotatable means disposed in side by side relation; a support extending through said rotatable means; an outer bearing race in each of said outer rotatable means, and surrounding said support, each outer bearing race comprising an annular bottom wall and a pair of lips projecting inward from the edges thereof; a set of cylindrical bearing rollers in each of said outer races; and inner bearing race means on said support to receive said rollers, comprising a plurality of bearing rings assembled in end to end engagement on said support, each having a radial bearing wall and a thrust receiving lip so that when said bearing rings are so assembled channels to receive said rollers will be formed in such spaced relation that said outer bearing races will be maintained in spaced relation.

DAVID M. SMITH.
WILLIAM H. FISHER.